United States Patent [19]
Lee et al.

[11] Patent Number: 5,537,170
[45] Date of Patent: Jul. 16, 1996

[54] PROJECTION-LENS DRIVING APPARATUS WITH A TIMING BELT

[75] Inventors: Dong-Hee Lee; Jun-Hyun Park, both of Seoul, Rep. of Korea

[73] Assignee: Daewoo Electronics Co., Ltd., Seoul, Rep. of Korea

[21] Appl. No.: 524,710

[22] Filed: Sep. 7, 1995

[30]     Foreign Application Priority Data

Sep. 8, 1994 [KR]   Rep. of Korea ................. 94-22586

[51] Int. Cl.⁶ ................................................. G03B 21/00
[52] U.S. Cl. ........................................ 353/101; 359/694
[58] Field of Search ............................ 353/31, 94, 100,
353/101, 122; 359/677, 679, 683, 694–696,
703, 705, 821–823, 896; 348/745–747,
806–807

[56]              References Cited

U.S. PATENT DOCUMENTS 5,125,733   6/1992  Lee .............................................. 353/7
5,426,471   6/1995  Tanaka et al. ........................... 348/745

*Primary Examiner*—William C. Dowling
*Attorney, Agent, or Firm*—Anderson Kill Olick & Oshinsky

[57]              ABSTRACT

The projection-lens driving apparatus having a housing with a top and a bottom faces for use in a 3-beam projector includes an upper plate, an upper projection-lens holder, a pair of cross link, a pair of lower projection-lens holders, a guide bracket, a sliding plate, an upper guide member, a lower guide member, a timing belt, a driving means divided into a first driving means for driving the upper guide member and a second driving means for driving the lower guide member. The upper and the lower projection-lens holders is respectively fitted to the upper and the lower guide members mechanically and physically in such a way that they can be driven integrally using the driving means, thereby allowing the images to coincide on the screen accurately and, above all, simultaneously.

4 Claims, 5 Drawing Sheets

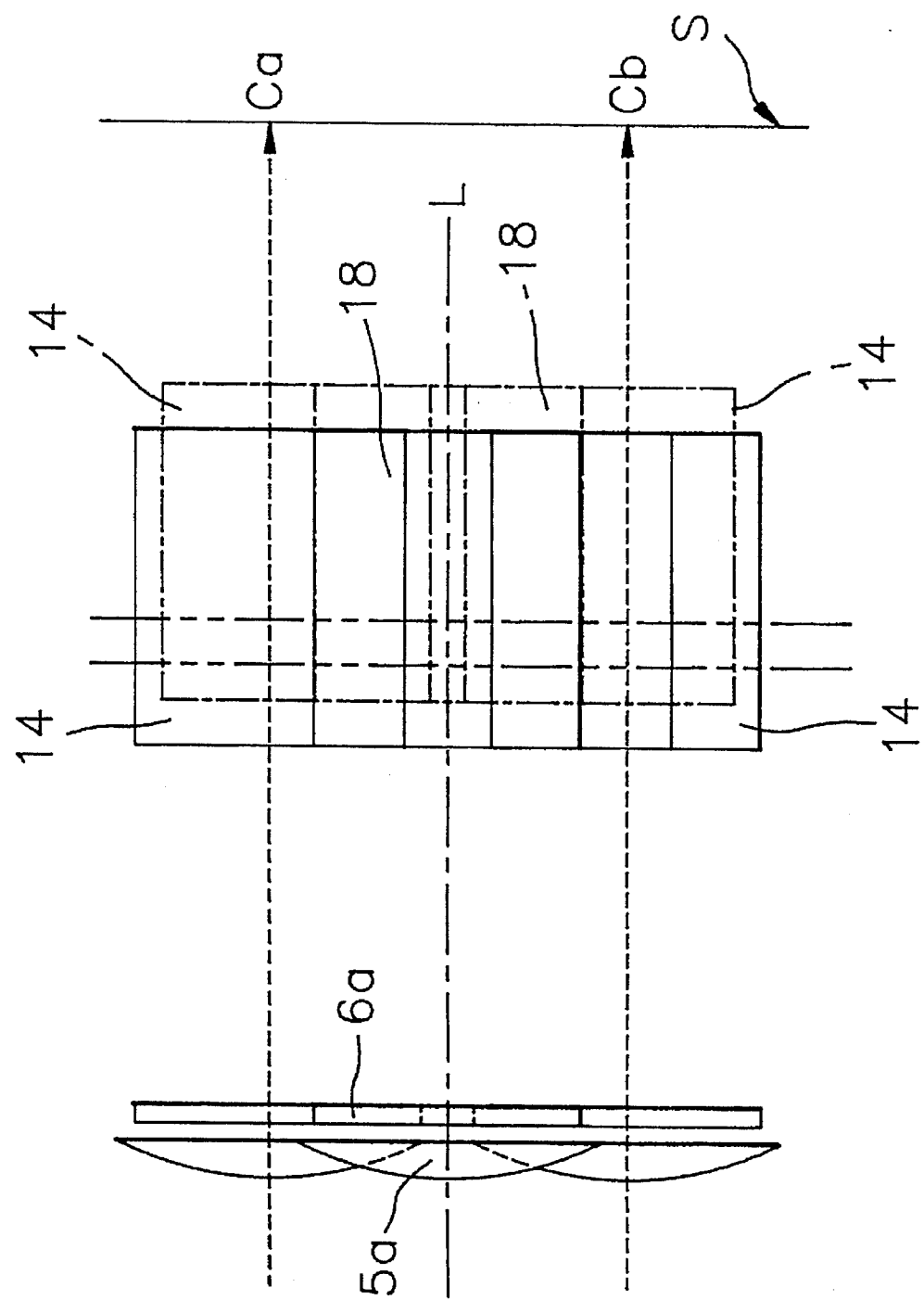

PROJECTION-LENS DRIVING APPARATUS WITH A TIMING BELT

FIELD OF THE INVENTION

The present invention relates to a projection-lens driving apparatus for use in a 3-beam projector; and, more particularly, to an improved projection-lens driving apparatus capable of allowing three projection-lens holders incorporated in the apparatus to be driven integrally, thereby providing a simultaneous focussing of three images on a screen.

DESCRIPTION OF THE PRIOR ART

As shown in FIG. 1, a conventional 3-beam projector typically comprises three image-projection units 1a, 1b and 1c, each of the image-projection units, e.g., 1a, including a lamp 4a, a spherical reflecting mirror 3a, a focusing lens device 5a, a slide film or LCD (liquid crystal display) panel 6a and a projecting lens 7a, respectively. Each of the image-projection units, e.g., 1a, is provided with an associated optical axis La. Each of the image-projecting units 1a, 1b and 1c is individually driven to coincide each of the images to thereby produce a total image on a screen S having a central axis L. Specifically, in order to produce the total image on the screen S, an operator first focuses an image projected from one of the units, e.g., 1a, on the screen S and then focuses and moves the remaining images projected from the other units 1b, 1c on the screen S to coincide the three images.

There are a number of disadvantages with such a 3-beam conventional projection system. The optical axes Lb, Lc of the units 1b and 1c are inclined at a certain angle with respect to the central axis L of the screen S so that each of the images projected from the corresponding image-projecting unit has a trapezoidal shape as shown in FIG. 2, resulting in a keystoning phenomenon, the keystoning phenomenon referring to a distortion of images caused by a failure of the images to coincide completely with each other, causing an eye fatigue to viewers. In addition to the above, the task of the matching and focusing the three images on the screen S becomes rather tricky and cumbersome, since each of the three image-projecting units must be individually driven and adjusted.

There is disclosed in U.S. Pat. No. 5,125,733 entitled "STEREOSCOPIC PROJECTOR AND METHOD FOR DRIVING PROJECTING LENSES", a method and an apparatus for driving projection lenses integrally in a stereoscopic projector. However, as the title indicates, the method and the apparatus disclosed in the above patent pertain to a stereoscopic projector only.

SUMMARY OF THE INVENTION

It is, therefore, a primary object of the present invention to provide an improved projection-lens driving apparatus for use in a 3-beam projector capable of allowing three projection-lens holders, each containing a projection-lens, to be driven integrally, thereby providing a simultaneous focussing of three images on a screen.

In accordance with one aspect of the present invention, there is provided a projection-lens driving apparatus for use in a 3-beam projector contained in a housing provided with an upper and a lower faces, comprising: an upper plate fixed to the upper face of the housing and provided with a pair of straight motion guide slots and a pair of vertical motion guide slots; an upper projection-lens holder having a top and a bottom surface that are parallel to each other, a pair of side surfaces that are parallel to each other, a front and a rear surface that are also parallel to each other, the top surface thereof being provided with a pair of fixed parts and a pair of guide slots, the upper projection-lens holder further including a boss on each of the side surfaces thereof, each of the bosses being identically shaped and sized, each of the bosses further being identically located on each of the side surfaces thereof, each of the bosses including a vertical inserting hole; a pair of cross links, each of the cross links including a pair of link pieces articulated about a hinge point, wherein the upper projection-lens holder is mechanically connected to the upper plate through the pair of cross links in such a way that a lower end of one link piece in each pair of link pieces in each of the cross links is coupled to one of the fixed parts on the upper projection-lens holder, an upper end thereof being fitted to one of the vertical motion guide slots of the upper plate, and a lower end of the other link piece in the same pair is fitted to a corresponding one of the guide slots of the upper projection-lens holder, an upper end thereof being fitted to a corresponding one of the straight motion guide slots of the upper plate; a pair of lower projection-lens holders located on the lower face of the housing, running parallel to each other, each of the lower projection-lens holders being provided with a top and a bottom surface that are parallel to each other, a pair of side surfaces that are parallel to each other, a front and a rear surface that are also parallel to each other, each of the lower projection-lens holders having a pair of trace slots on the top surface thereof and a horizontal inserting hole; a guide bracket fixed to the housing and positioned between the upper and the lower projection-lens holders, the guide bracket including a top and a bottom surface and provided with two pairs of guide protrusions on the bottom surface thereof, wherein each pair of the guide protrusions is fitted into the pair of trace slots on the top surface of each of the lower projection-lens holders, thereby mechanically connecting the guide bracket with the pair of lower projection-lens holders; a sliding plate located on the upper surface of the guide bracket; an upper guide member sliding on the sliding plate, the upper guide member including a top and a bottom surfaces and provided with a pair of engaging pins, a first threaded hole with a predetermined depth located at its center longitudinally, wherein one end of each of the engaging pins is attached on the top surface of the upper guide plate, each of the engaging pins extending upward and inserted into each of the vertical inserting holes on each of the bosses on the upper projection-lens holder, thereby mechanically connecting the upper guide member with the upper projection-lens holder; a lower guide member positioned between the lower projection-lens holders, the lower guide member including a pair of coupling rods and a feed screw inserted boss with a second threaded hole, wherein one end of each of the coupling rods is attached on the feed screw inserted boss, each of the coupling rods pointing horizontally in an opposite direction from each other and each of the coupling rods being inserted into the horizontal inserting hole in each of the lower projection-lens holders, thereby mechanically connecting the pair of lower projection-lens holders together with the lower guide member; and a driving means divided into a first driving means for driving the upper guide member and a second driving means for driving the lower guide member, the first driving means including a motor, a motor shaft, a first gear, and a first feed screw and the second driving means having a second gear and a second feed screw, each of the gears being coupled by a timing belt so as to transfer the driving force of the first driving means to the second driving means, wherein the first and the second feed screws are respectively engaged into the first threaded hole of the upper guide member and the second threaded hole of the lower guide member 36 so that a rotation of the motor will cause an integrated movement of the upper and the pair of lower projection-lens holders.

BRIEF DESCRIPTION OF THE DRAWINGS

The above and other objects and features of the present invention will become apparent from the following description of preferred embodiments when taken in conjunction with the accompanying drawings, in which:

FIG. 5 offers an explanation of the method for driving an upper and a pair of lower projection-lens holders in accordance with the present invention.

DETAILED DESCRIPTION OF THE PREFERRED EMBODIMENT

Figure 1:
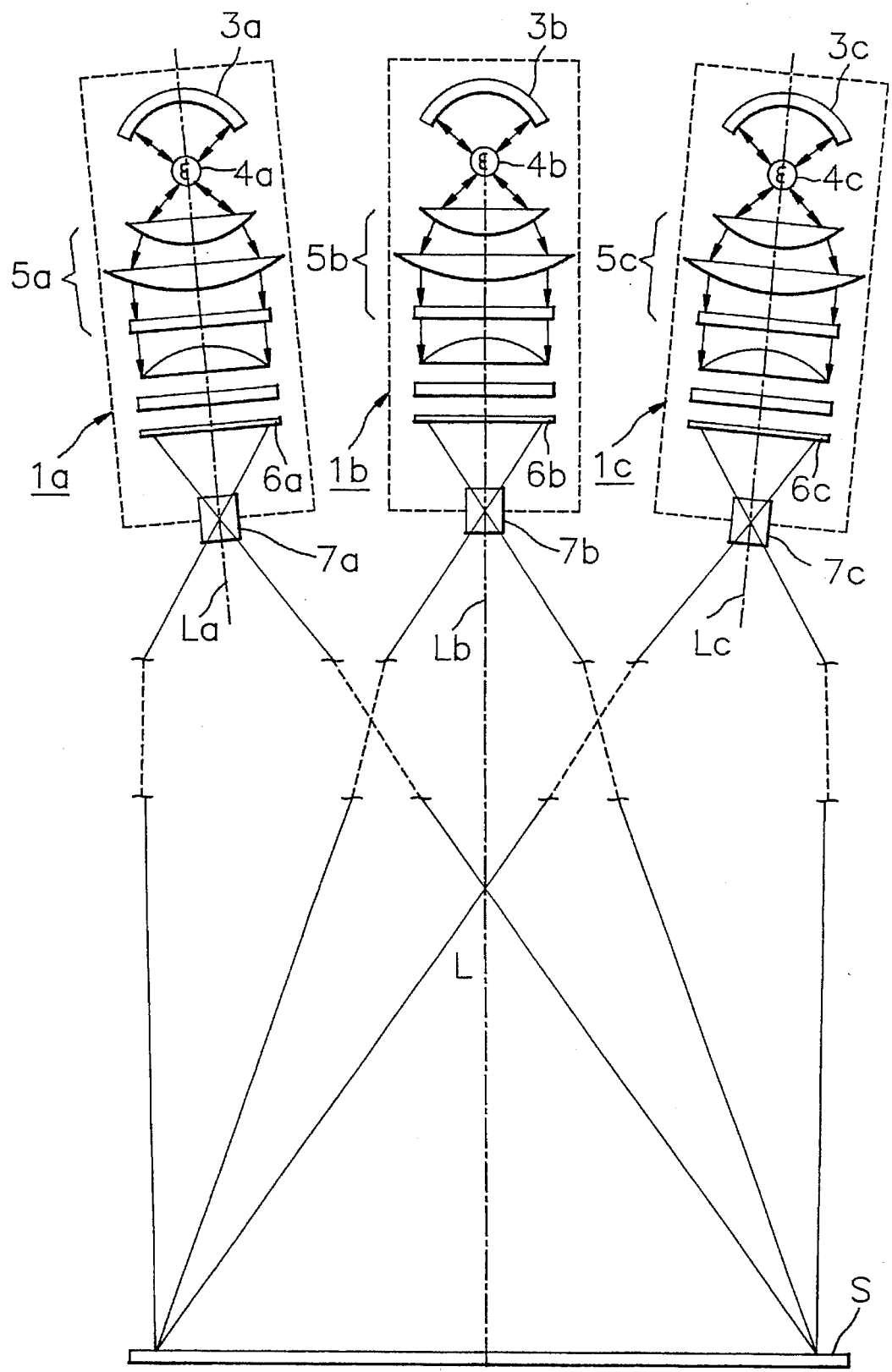
FIG. 1 presents a schematic view of a conventional stereoscopic image projector.
Figure 2:
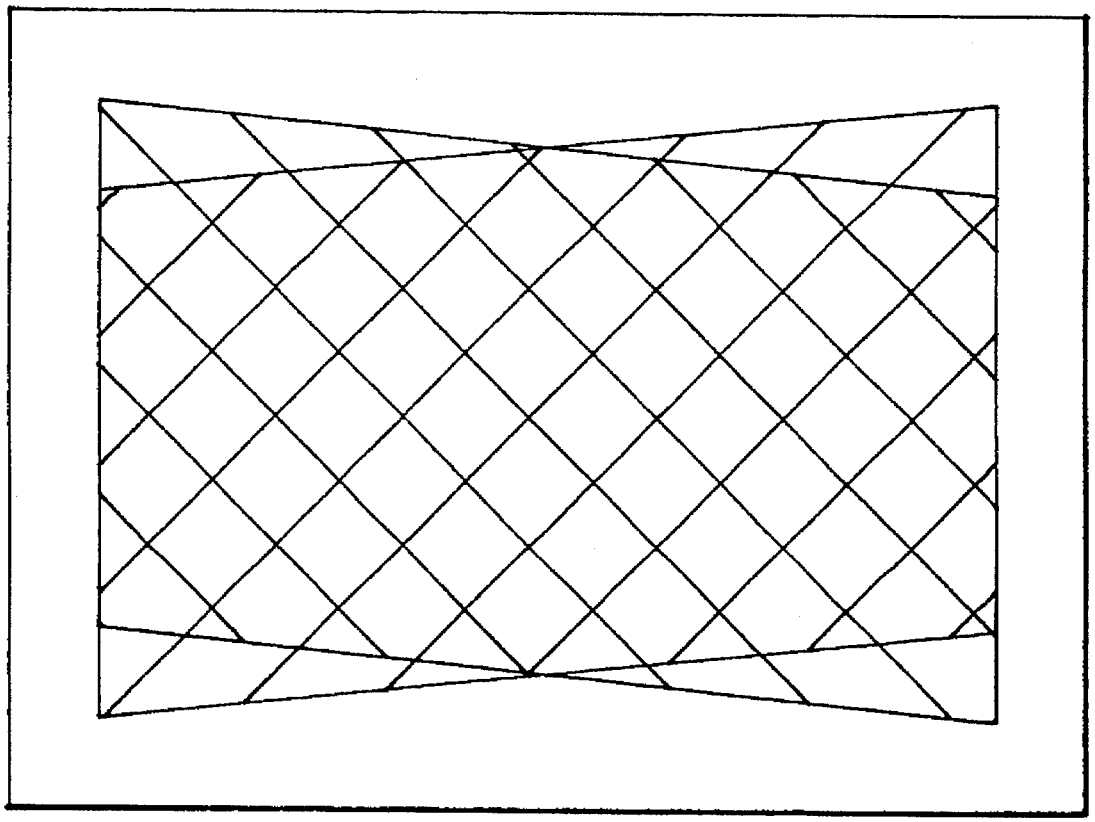
FIG. 2 depicts a schematic view of images produced on a screen in accordance with the conventional stereoscopic image projector.
Figure 3:
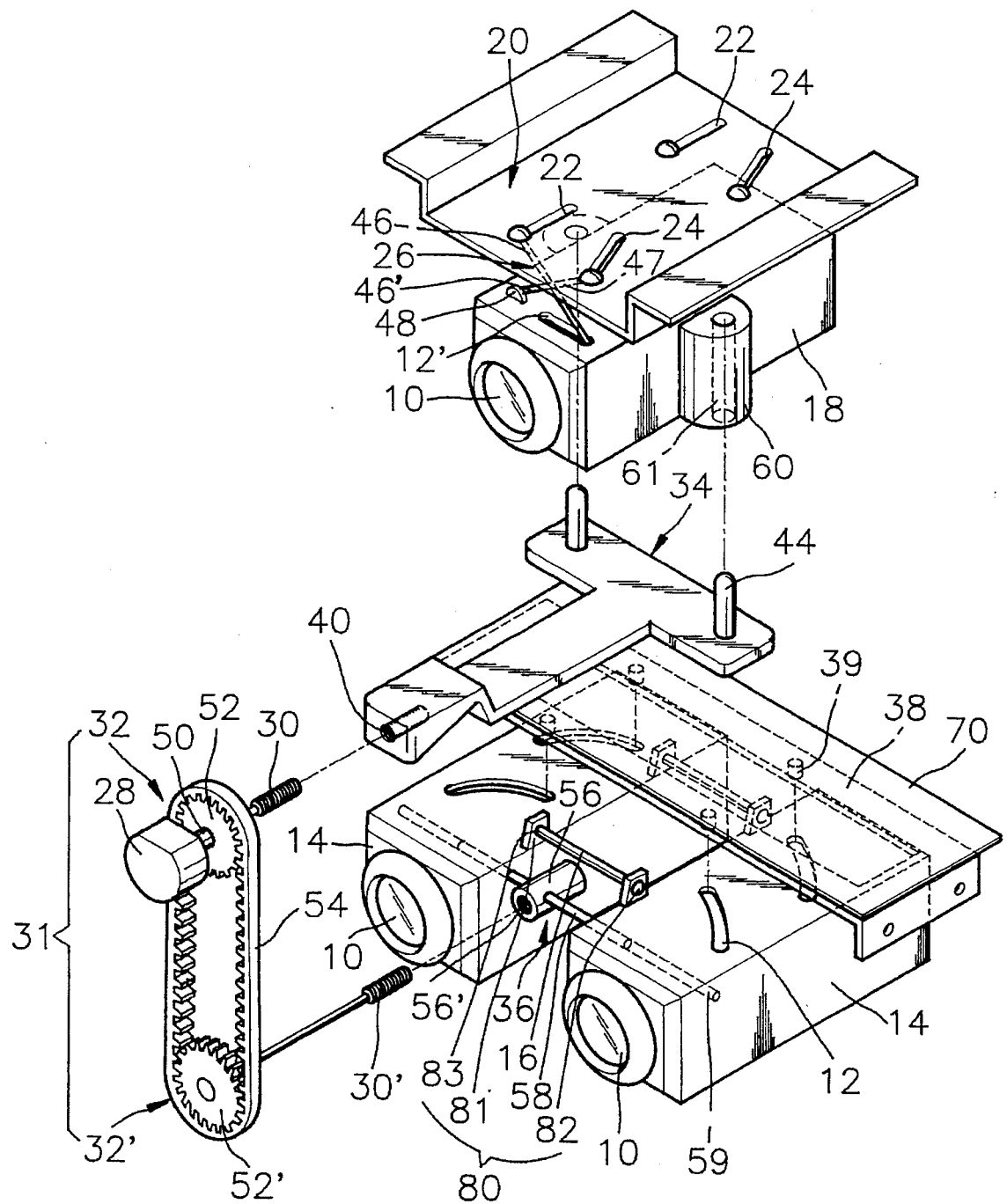
FIG. 3 shows an exploded perspective view of the projection-lens driving apparatus in accordance with the present invention.

There is shown in FIG. 3 an exploded perspective view of an inventive projection-lens driving apparatus 100 including a housing (not shown) having an upper and a lower faces, an upper plate 20 fixed to the upper face of the housing and provided with a pair of straight motion guide slots 22 and a pair of vertical motion guide slots 24, a pair of cross links 26, an upper projection-lens holder 18, a pair of lower projection-lens holders 14, an upper guide member 34, a lower guide member 36, a guide bracket 38, a sliding plate 70 and a driving means 31 divided into a first and a second driving means 32, 32'.

In the inventive projection-lens driving apparatus 100, the upper and the pair of lower projection-lens holders 18, 14 are similar in their general appearances and in their dimensions: they are parallelopiped, each of them being provided with a top and a bottom surfaces that are parallel to each other, a pair of side surfaces that are parallel to each other, and a front and a rear surfaces that are also parallel to each other.

Each of the upper and the lower projection-lens holders 18, 14 includes a projection lens 10. Each of the lower projection-lens holders 14 includes a pair of trace slots 12 on the top surface thereof and a horizontal inserting hole 59 near the front surface thereof, the horizontal inserting hole 59 extending from one side surface to the other side surface thereof. The pair of lower projection-lens holders 14 are located on the lower face of the housing, running parallel to each other, and the upper projection-lens holder 18 is located above and between the pair of lower projection-lens holders 14 in such a way that an imaginary plane bisecting the upper projection-lens holder 18 vertically and longitudinally coincides with an imaginary plane parallel to and located at an equidistance from each of the two facing side surfaces from the pair of lower projection-lens holders 14.

The upper projection-lens holder 18 is provided with a pair of fixed parts 48 and a pair of guide slots 12' on the top surface thereof. Each of the side surfaces of the upper projection-lens holders 18 is provided with a boss 60 having a vertical inserting hole 61, the vertical inserting hole 61 running parallel to the side surface thereof. The boss and the vertical inserting hole are identically located on each of the side surfaces.

Each of the cross links 26 is provided with a pair of link pieces 46, 46', each of which is articulated in a right-left and an upward-downward directions about a hinge point 47. The upper projection-lens holder 18 is attached to the upper plate 20 using the pair of cross links 26 in such a way that a lower end of one link piece 46' in each pair of link pieces 46, 46' in each of the cross links 26 is coupled to one of the fixed parts 48 on the upper projection-lens holders 18, an upper end thereof being fitted to one of the vertical motion guide slots 24 of the upper plate 20, and a lower end of the other link piece 46 in the same pair is fitted to a corresponding one of the guide slots 12' of the upper projection-lens holder 18, an upper end thereof being fitted to a corresponding one of the straight motion guide slots 22 of the upper plate 20.

The guide bracket 38 fixed to the housing is located between the upper and the pair of lower projection-lens holders 18, 14 and includes a top and a bottom surfaces and is provided with two pairs of guide protrusions 39 on the bottom surface thereof. Each pair of the guide protrusions 39 is engaged with the pair of trace slots 12 on the top surface of each of the lower projection-lens holders 14 to thereby mechanically couple the guide bracket 38 with the pair of lower projection-lens holders 14. On the upper surface of the guide bracket 38 is located the sliding plate 70.

The upper guide member 34 positioned on top of the sliding plate 70 includes a top and a bottom surfaces, and is provided with a pair of engaging pins 44, a first threaded hole 40 with a predetermined depth at its center, running in a longitudinal direction, i.e., the direction parallel to the center axis of the inventive apparatus 100, wherein one end of each of the engaging pins 44 is attached on the top surface of the upper guide plate 34, each of the engaging pins 44 extending upward and inserted into each of the vertical inserting holes 61 of the bosses 60, thereby mechanically connecting the upper guide member 34 with the upper projection-lens holder 18.

The lower guide member 36 positioned between the pair of lower projection-lens holders 14 includes a pair of coupling rods 58 and a feed screw inserted boss 56 with a second threaded hole 56' running in the same direction as the first threaded hole 40, wherein one end of each of the coupling rods 58 is attached on the feed screw inserted boss 56, each of the coupling rods 58 pointing horizontally in an opposite direction from each other. Each of the coupling rods 58 on the lower guide member 36 is inserted into each of the horizontal inserting holes 59 on each of the lower projection-lens holders 14 to thereby mechanically connect the pair of lower projection-lens holders 14 with the lower guide member 36.

The driving means 31 is divided into the first driving means 32 for driving the upper guide member 34 and the second driving means 32' for driving the lower guide member 36, the first driving means 32 having a motor 28, a motor shaft 50, a first gear 52, and a first feed screw 30, the second driving means 32' having a second gear 52' and a second feed screw 30', wherein each of the gears 52, 52' is coupled by a timing belt 54 so as to transfer the driving force of the first driving means 32 to the second driving means 32' to thereby integrally move the upper and the lower projection-lens holders 18, 14. The first and the second feed screw 30, 30' are respectively are engaged into the first threaded hole 40 of the upper guide member 34 and the second threaded hole 56' of the lower guide member 36.

The motor 28 of the first driving means 32 is electrically connected to a control switch (not shown) on a panel (not shown) and is also connected to the feed screw 30.

Figure 4:
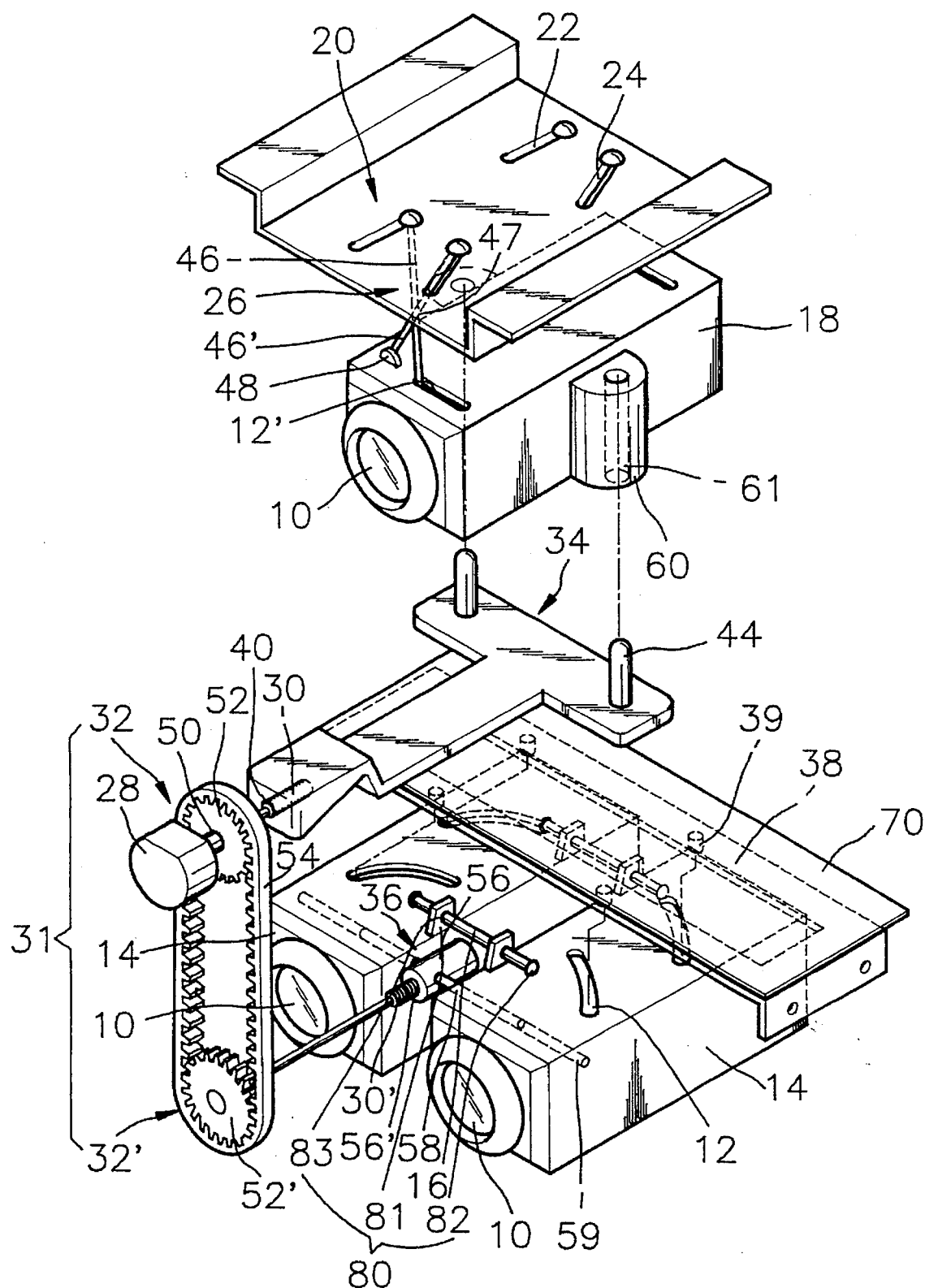
FIG. 4 represents an assembled perspective view of the preferred embodiment of the projection-lens driving apparatus shown in FIG. 3, showing the operation thereof.

The operation of the inventive projection-lens driving apparatus 100 will now be described with reference to FIG. 4.

When an operator pushes the control switch on the panel in order to match and focus projected images on a screen, the motor 28, and hence the first and the second feed screws mechanically coupled through the timing belt 54 and the first and the second gears 52, 52' will rotate and, in response to the rotation thereof, each of the upper and the lower guide members 34, 36 will be driven toward the screen or away from the screen.

The pair of lower projection-lens holders 14 connected to each other via the pair of coupling rods 58 on the lower guide member 36 will be then integrally driven toward or away from the screen and inward or outward with respect to the imaginary plane parallel to and located at an equidistance from each of the two facing side surfaces from the pair of lower projection-lens holders 14, the imaginary plane further being perpendicular to the screen.

The upper projection-lens holder 18 connected to the upper guide member 34 through the pair of engaging pins 44 will be also driven toward or away from the screen and the pair of lower projection-lens holders 14.

For instance, when the upper guide member 34 is driven toward the screen in response to the rotation of the motor 28 and hence the rotation of the first feed screw 30, the upper projection-lens holder 18 is driven toward the screen and the pair of lower projection-lens holders 14 along the pair of straight motion guide slots 22 and the pair of vertical motion guide slots 24 by means of the pair of cross links 26. When the lower guide member 36 is driven toward the screen in response to the rotation of the motor 28 and hence the rotation of the second feed screw 30', each of the lower projection-lens holders 14 is driven toward the screen and inward with respect to the imaginary plane along each of the trace slots 12 by the movements of the coupling rods 58 of the lower guide member 36 and the guide protrusions 39 of the guide bracket 38.

On the other hand, when each of the upper guide member 34 and the lower guide member 36 moves away from the screen, the upper and the lower projection-lens holders 18, 14 are driven reversely.

Therefore, by controlling the rotation of the motor, the upper and the lower projection-lens holders can be integrally driven, allowing the operator to match and focus the images on the screen simply, conveniently, accurately, and above all, simultaneously.

In order to enhance the stability in the movement of the pair of lower projection-lens holders 14, one or more of stabilizing means 80 can be incorporated into the inventive projection-lens driving apparatus 100, the stabilizing means 80 including a pair of supporting plates 81, each of the supporting plates 81 being provided with an opening 83, and a guide rod 16 having a pair of stoppers 82 placed at both ends thereof, wherein each of the supporting plates 81 is located on the top surface of each of the lower projection-lens holders 14 and the guide rod 16 is inserted through the opening 83 on each of the supporting plates 81, the stopper 82 on each end thereof setting a limit on the maximum distance separable between the pair of lower projection-lens holders 14.

In such an arrangement, the guide rod, in addition to setting a limit on the maximum distance that the pair of lower projection-lens holders can be separated, enhances the stability in the movement thereof by providing an extra support.

FIG. 5 is a partial schematic view of a 3-beam projector incorporating therein the inventive projection-lens driving apparatus 100, illustrating its relationship to a screen S and a triplet of LCD panels 6a, 6b and 6c, wherein each of the LCD panels, e.g., 6a, is provided with a respective optical axis Ca, the optical axis Ca being parallel to the central axis L of the screen S.

The upper and the pair of lower projection-lens holders 18, 14 are also arranged such that the optical axis of each of the projection lenses is parallel with respective to the optical axes Ca, Cb, Cc of the LCD panels 6a, 6b, 6c. The upper and the pair of lower projection-lens holders 18, 14 are adjusted to move integrally toward and away from the screen S and move inward and outward and in parallel with the central axis L of the screen S, thereby enabling the operator to focus and match images simultaneously.

Although the invention has been shown and described with respect to the preferred embodiments, it will be understood by those skilled in the art various changes and modifications may be made without departing from the scope of the invention as defined in the following claims.

What is claimed is:

1. A projection-lens driving apparatus for use in a 3-beam projector contained in a housing provided with an upper and a lower face, comprising:

an upper plate fixed to the upper face of the housing and provided with a pair of straight motion guide slots and a pair of vertical motion guide slots;

an upper projection-lens holder having a top and a bottom surface that are parallel to each other, a pair of side surfaces that are parallel to each other, a front and a rear surface that are also parallel to each other, the top surface thereof being provided with a pair of fixed parts and a pair of guide slots, the upper projection-lens holder further including a boss on each of the side surfaces thereof, each of the bosses being identically shaped and sized, each of the bosses further being identically located on each of the side surfaces thereof, each of the bosses including a vertical inserting hole;

a pair of cross links, each of the cross links including a pair of link pieces articulated about a hinge point, wherein the upper projection-lens holder is mechanically connected to the upper plate through the pair of cross links in such a way that a lower end of one link piece in each pair of link pieces in each of the cross links is coupled to one of the fixed parts on the upper projection-lens holder, an upper end thereof being fitted to one of the vertical motion guide slots of the upper plate, and a lower end of the other link piece in the same pair is fitted to a corresponding one of the guide slots of the upper projection-lens holder, an upper end thereof being fitted to a corresponding one of the straight motion guide slots of the upper plate;

a pair of lower projection-lens holders located on the lower face of the housing, running parallel to each other, each of the lower projection-lens holders being provided with a top and a bottom surface that are parallel to each other, a pair of side surfaces that are parallel to each other, a front and a rear surface that are also parallel to each other, each of the lower projection-lens holders having a pair of trace slots on the top surface thereof and a horizontal inserting hole;

a guide bracket fixed to the housing and positioned between the upper and the lower projection-lens holders, the guide bracket including a top and a bottom surface and provided with two pairs of guide protrusions on the bottom surface thereof, wherein each pair of the guide protrusions is fitted into the pair of trace slots on the top surface of each of the lower projection-lens holders, thereby mechanically connecting the guide bracket with the pair of lower projection-lens holders;

a sliding plate located on the upper surface of the guide bracket;

an upper guide member sliding on the sliding plate, the upper guide member including a top and a bottom surface and provided with a pair of engaging pins, a first threaded hole with a predetermined depth located at its center longitudinally, wherein one end of each of the engaging pins is attached on the top surface of the upper guide plate, each of the engaging pins extending upward and inserted into each of the vertical inserting holes on each of the bosses on the upper projection-lens holder, thereby mechanically connecting the upper guide member with the upper projection-lens holder;

a lower guide member positioned between the lower projection-lens holders, the lower guide member including a pair of coupling rods and a feed screw inserted boss with a second threaded hole, wherein one end of each of the coupling rods is attached on the feed screw inserted boss, each of the coupling rods pointing horizontally in an opposite direction from each other and each of the coupling rods being inserted into the horizontal inserting hole in each of the lower projection-lens holders, thereby mechanically connecting the pair of lower projection-lens holders together with the lower guide member; and a driving means divided into a first driving means for driving the upper guide member and a second driving means for driving the lower guide member, the first driving means including a motor, a motor shaft, a first gear, and a first feed screw and the second driving means having a second gear and a second feed screw, each of the gears being coupled by a timing belt so as to transfer the driving force of the first driving means to the second driving means, wherein the first and the second feed screws are respectively engaged into the first threaded hole of the upper guide member and the second threaded hole of the lower guide member so that rotation of the motor will cause an integrated movement of the upper and the pair of lower projection-lens holders.

2. The projection-lens driving apparatus of claim 1, further comprising one or more of stabilizing means, the stabilizing means including a pair of supporting plates, each of the supporting plates being provided with an opening, and a guide rod having a pair of stoppers placed at both ends thereof.

3. The projection-lens driving apparatus of claim 1, wherein the upper projection-lens holder is located above and between the pair of lower projection-lens holders in such a way that an imaginary plane bisecting the upper projection-lens holder vertically and longitudinally coincides with an imaginary plane parallel to and located at an equidistance from each of the two facing side surfaces from the pair of lower projection lens holders.

4. The projection-lens driving apparatus of claim 1, wherein each of the upper and the lower projection-lens holders includes a projection lens.

* * * * *